United States Patent
Lin et al.

(10) Patent No.: US 8,090,413 B2
(45) Date of Patent: Jan. 3, 2012

(54) PORTABLE ELECTRONIC DEVICE AND METHOD FOR MANAGING ICONS THEREOF

(75) Inventors: Chung-Ching Lin, Tu-Cheng (TW); Chi-Chung Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 482 days.

(21) Appl. No.: 12/345,890

(22) Filed: Dec. 30, 2008

(65) Prior Publication Data

US 2010/0035659 A1 Feb. 11, 2010

(30) Foreign Application Priority Data

Aug. 7, 2008 (CN) .......................... 2008 1 0303581

(51) Int. Cl.
*H04B 1/38* (2006.01)
*H04M 1/00* (2006.01)

(52) U.S. Cl. ..................................................... 455/566
(58) Field of Classification Search ............... 455/575.4, 455/566
See application file for complete search history.

(56) References Cited

U.S. PATENT DOCUMENTS

2008/0254839 A1* 10/2008 Lee .............................. 455/566
* cited by examiner

*Primary Examiner* — Lincoln Donovan
*Assistant Examiner* — Daniel Rojas
(74) *Attorney, Agent, or Firm* — Altis Law Group, Inc.

(57) ABSTRACT

A portable electronic device includes a main body, a slidable cover, a display panel, a sensor, and a controlling module. The slidable cover is slidably positioned on the main body. The display panel is positioned on the slidable cover. The sensor is configured to detect a position of the slidable cover relative to the main body. The controlling module is configured to output icons and data to the display panel, and to adjust an area of each icon displayed on the display panel according to a position, detected by the sensor, of the slidable cover relative to the main body.

11 Claims, 4 Drawing Sheets

PORTABLE ELECTRONIC DEVICE AND METHOD FOR MANAGING ICONS THEREOF

BACKGROUND

1. Technical Field

The present disclosure relates to a portable electronic device and a method for managing icons of the portable electronic device.

2. Description of the Related Art

Electronic devices, such as mobile phones, notebook computers, and personal digital assistants, have been widely used in recent years. These electronic devices generally have touch panels.

A typical portable electronic device includes a main body, a slidable cover slidably positioned over the main body, a touch panel fixed in the slidable cover, and a keyboard positioned on the main body. When the slidable cover is positioned over the main body and the touch panel is in an operable state, a user may apply pressure onto the touch panel to input predetermined information into the portable electronic device.

The touch panel displays a plurality of icons to be touched by the user. A density of the icons on the touch panel increases as a number of functions of the portable electronic device increases. However, the touch panel needs to be designed in consideration of a volume and a weight of the portable electronic device. As a result, an area of each icon is relatively small. Thus, it would be difficult for a user to identify the different icons. In addition, a user may inadvertently touch several icons at once.

Therefore, a portable electronic device and method of managing icons thereof is desired in order to overcome the above-described shortcoming.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
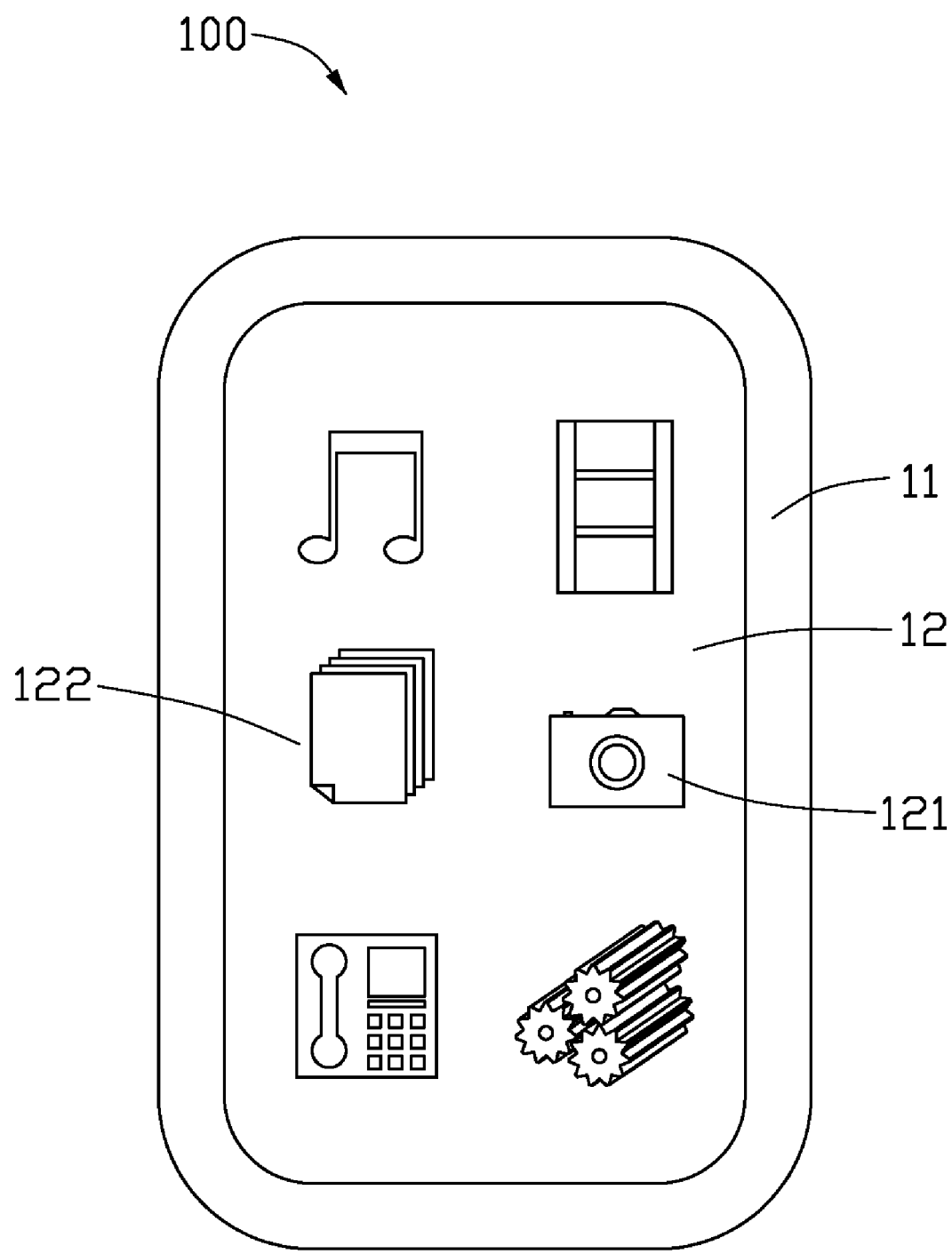
FIG. 1 is a plan view of an embodiment of a portable electronic device including a main body and a slidable cover, when the slidable cover is positioned over the main body.
Figure 2:
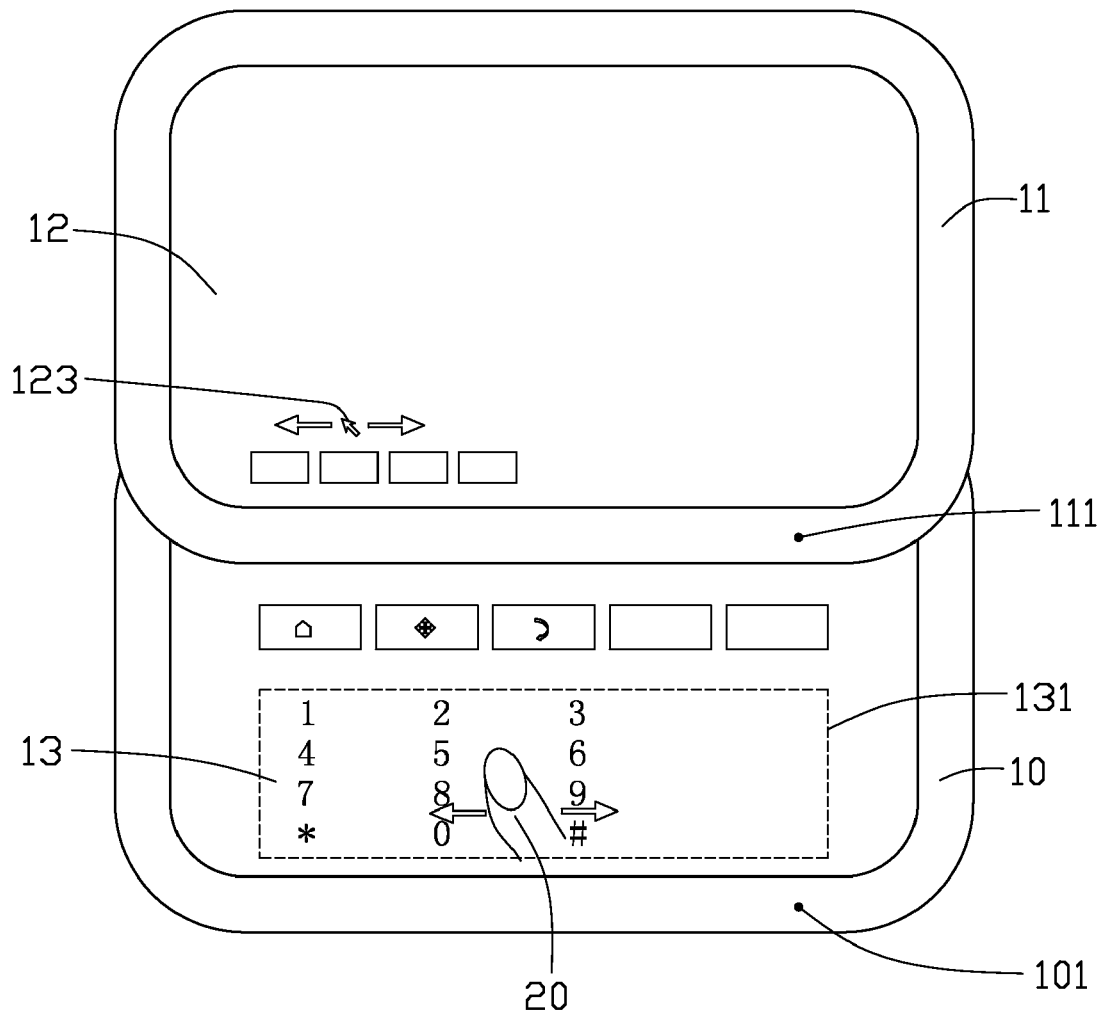
FIG. 2 is a plan view of a portable electronic device in FIG. 1, when the slidable cover is slid out from the main body.

Referring to FIGS. 1 and 2, a cell phone 100 includes a main body 10, a keyboard 13 fixed on the main body 10, a slidable cover 11 slidably attached on the main body 10 and covering the keyboard 13, and a liquid crystal display 12 fixed on the slidable cover 11. The liquid crystal display 12 is configured to display a plurality of icons 121. Each icon 121 may have a different size, such as a small icon size and a large icon size. A touch panel 122 is positioned on a surface of the liquid crystal display 12 to input data into the cell phone 100, such as by using a finger. In the illustrated embodiment, the touch panel 122 is a capacitive touch panel.

When the slidable cover 11 is positioned over the main body 10 and in a closed state, and the touch panel 122 is in an operation condition, a user may apply pressure onto the touch panel 122 to input information into the cell phone 100. When the slidable cover 11 is slid out of the main body 10 and in an open state, the key board 13 is exposed out of the slidable cover 11, so it can be easily operated. A capacitive touch plate 131 may be positioned underneath the keyboard 13 and a guide mark 123 may be displayed on the liquid crystal display 12, to facilitate users who could not use stylus on capacitive touch lens under Windows Mobile O.S. When a finger moves along a surface of the keyboard 13, the guide mark 123 moves, as a mouse, on the liquid crystal display 12.

Figure 3:
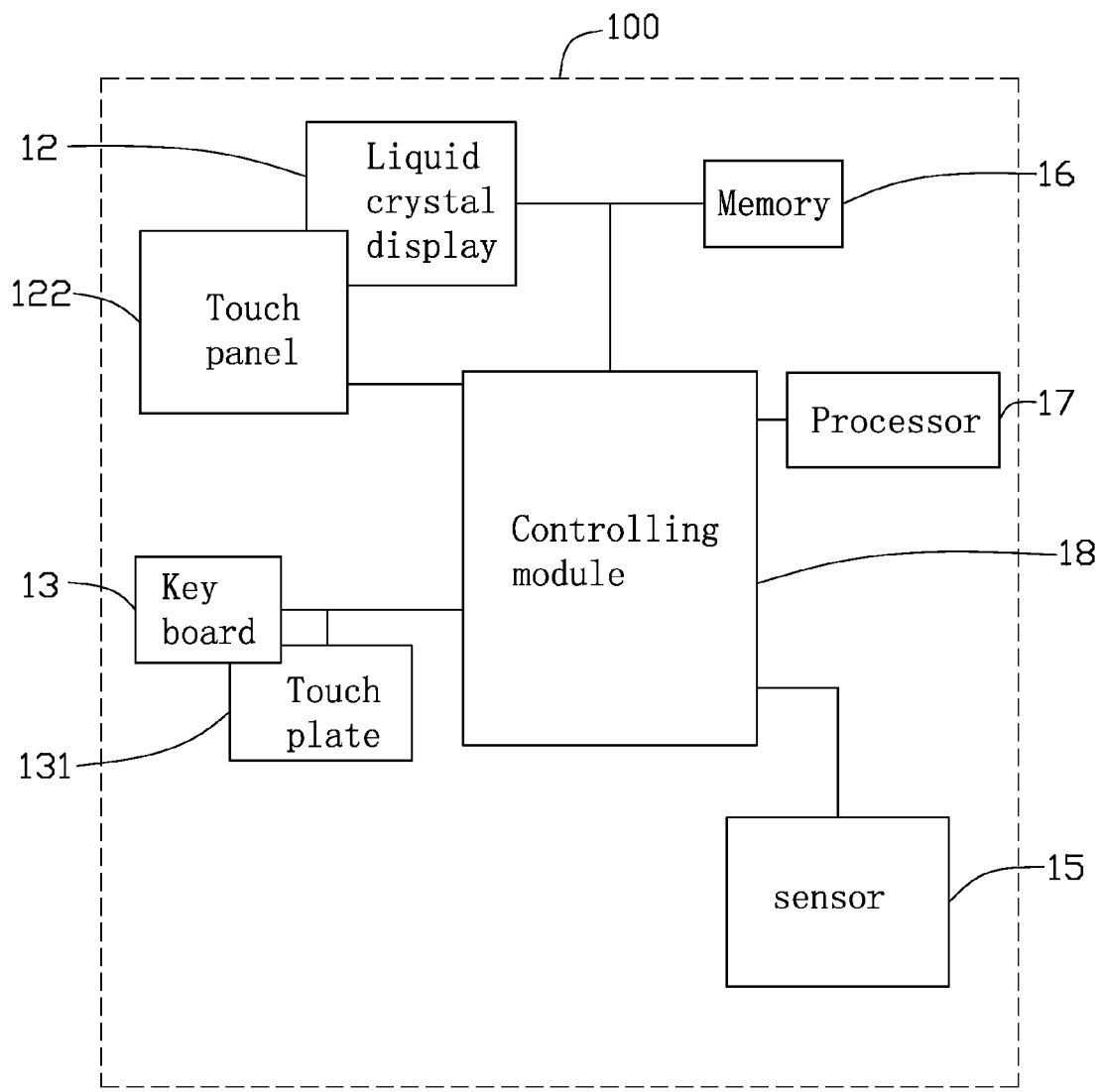
FIG. 3 is a block diagram of the portable electronic device in FIG. 1.

As shown in FIG. 3, the cell phone 100 further includes a sensor 15, a memory 16, a processor 17, and a controlling module 18. The sensor 15 is configured to detect a position of the slidable cover 11 relative to the main body 10. The memory 16 is configured to provide data to the controlling module 18. The processor 17 is configured to receive and send communication signals. The controlling module 18 is configured to process the data provided by the memory 16 and output the icons 121 and other figures to the liquid crystal display 12.

Figure 4:
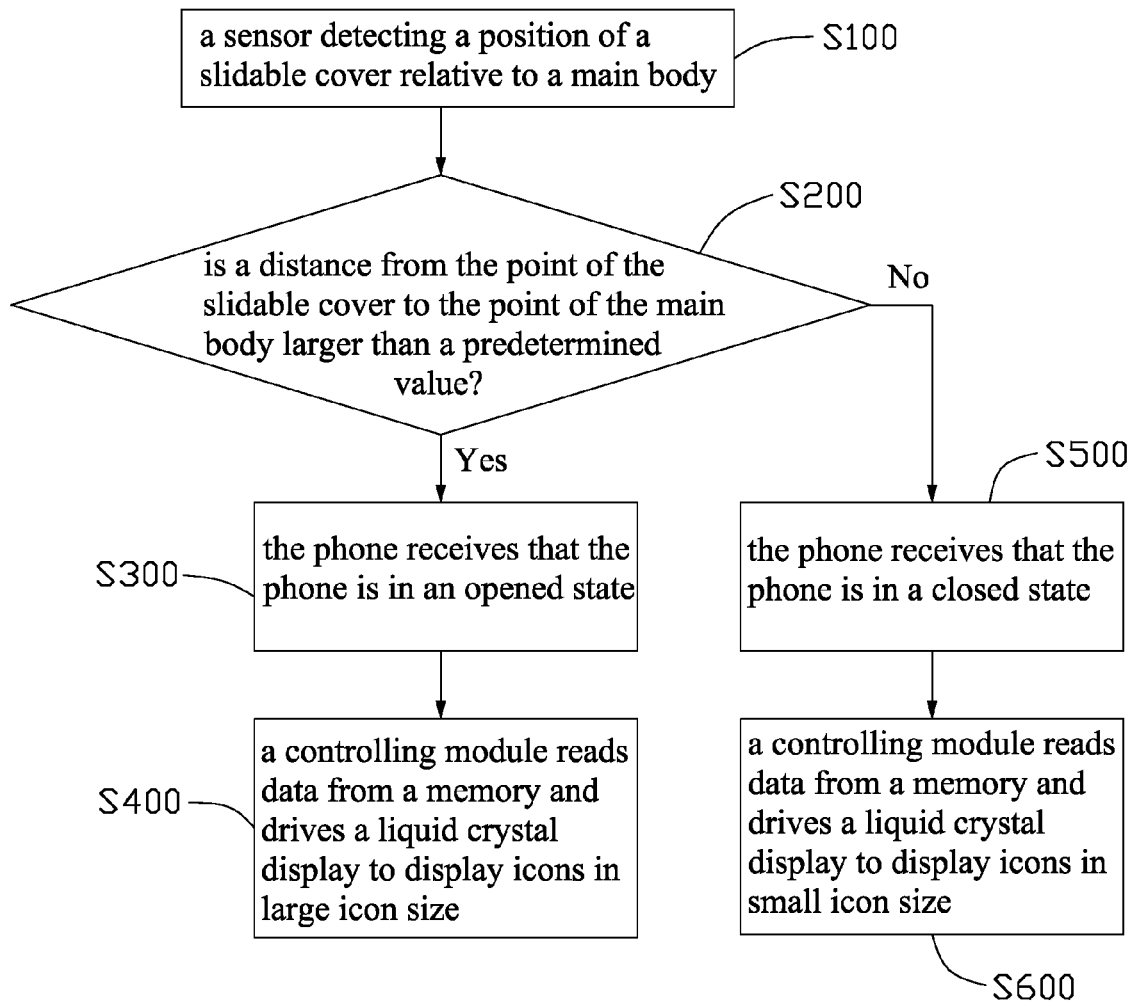
FIG. 4 is a flowchart illustrating an embodiment of a method of managing icons of the portable electronic device in FIG. 1.

FIG. 4 is a flowchart illustrating an embodiment of a method of managing icons 121 of the cell phone 100. Depending on the embodiment, certain of the steps described below may be removed, others may be added, and the sequence of steps may be altered.

In step S100, the sensor 15 detects a position of the slidable cover 11 relative to the main body 10.

In step S200, the processor 17 determines if a distance from a point 111 of the slidable cover 11 to a point 101 of the main body 10 is larger than a predetermined value. If the distance from the point 111 of the slidable cover 11 to the point 101 of the main body 10 is larger than the predetermined value, the slidable cover 11 is in the opened state, and the method continues to step S300. If the distance from the point 111 of the slidable cover 11 to the point 101 of the main body 10 is not larger than the predetermined value, the slidable cover 11 is in the closed state, and the method continues to step S500.

In step S300, the cell phone 100 receives a status that the slidable cover 11 is slid out of the main body 10, and the method continues to step S400. In step S400, the controlling module 18 reads data from the memory 16 and drives the liquid crystal display 12 to display icons 121 in the large icon size.

In step S500, the cell phone 100 receives a status that the slidable cover 11 is positioned on the main body 10 or partially positioned over the main body 10, and the method continues to step S600. In step S600, the controlling module 18 reads data from the memory 16 and drives the liquid crystal display 12 to display icons 121 in the small icon size.

In the illustrated embodiment, when the point 111 of the slidable cover 11 is aligned with the point 101 of the main body 10, the slidable cover 11 is in the closed state. If a distance from the point 111 of the slidable cover 11 to the point 101 of the main body 10 is not larger than a predetermined value such as 5 millimeters, the status of the cell phone 100 is in the closed state. If a distance from the point 111 of the slidable cover 11 to the point 101 of the main body 10 is larger than the predetermined value, a status of the cell phone 100 is in the opened state. In addition, when the slidable cover 11 is in the opened state, the keyboard 13 can be manually operated.

In the illustrated embodiment, an area of the large icon size is less than or equal to twice the area of the small icon size. In another embodiment, when some icons 121 having the large icon size are displayed, some icons 121 are hidden from the touch panel and a scroll menu is displayed in a side of the liquid crystal display 12. Thus, when the scroll menu is selected, icons 121 that were initially hidden from the touch panel 122 can be displayed on the liquid crystal display 12.

It should be pointed out that, the operating system of the cell phone 100 is windows Mobile such that the cell phone 100 facilitates users.

Finally, while various embodiments have been described and illustrated, the embodiments are not to be construed as being limited thereto. Various modifications can be made to the embodiments by those skilled in the art without departing from the true spirit and scope of the invention as defined by the appended claims.

What is claimed is:

1. A portable electronic device, comprising:
   a main body;
   a slidable cover slidably attached on the main body;
   a display panel positioned on the slidable cover for displaying a plurality of icons,
   a sensor configured to detect a position of the slidable cover relative to the main body;
   a processor configured to compare the position with a predetermined value and send signals; and
   a controlling module configured to output the icons to the display panel, and to enlarge or reduce an area of each icon displayed on the display panel according to the signals sent by the processor.

2. The portable electronic device as claimed in claim 1, wherein when the slidable cover is positioned over the main body or partially positioned over the main body, each icon displayed on the display panel is in the large icon size.

3. The portable electronic device as claimed in claim 2, further comprising a capacitive touch panel positioned on a surface of the display panel to input data into the portable electronic device.

4. The portable electronic device as claimed in claim 3, further comprising a keyboard positioned on the main body, wherein the slidable cover is capable of covering the keyboard.

5. The portable electronic device as claimed in claim 4, further comprising a touch plate positioned underneath the keyboard and a guide mark displayed on the display panel; the guide mark moves when a finger moves along a surface of the keyboard.

6. The portable electronic device as claimed in claim 5, wherein the touch plate is a capacitive touch plate.

7. A method of managing icons, comprising:
   providing a portable electronic device, the portable electronic device comprising a main body, a slidable cover slidably positioned on the main body, a sensor, a display panel positioned on the slidable cover and configured to display a plurality of icons having either a large icon size or a small icon size, and a controlling module;
   detecting a position of the slidable cover relative to the main body by the sensor;
   comparing the position with a predetermined value and send signals by a processor to the controlling module;
   upon a condition that the relative position is larger than a predetermined value, receiving a status that the portable electronic device is in an opened state and enlarging the icons and outputting the icons having the large icon size by the controlling module;
   upon a condition that the relative position is not larger than the predetermined value, receiving a status that the portable electronic device is in a closed state and reducing the icons and outputting the icons having the small icon size by the controlling module.

8. The method as claimed in claim 7, wherein an area of the large icon size is less than or equal to twice an area of the small icon size.

9. The method as claimed in claim 8, wherein when some of the icons having the large icon size are displayed, the other icons are hidden from the touch panel and a scroll menu is displayed in a side of the display panel.

10. The method as claimed in claim 9, wherein the portable electronic device further comprises a capacitive touch panel positioned on a surface of the display panel to input data into the portable electronic device.

11. The method as claimed in claim 10, wherein the portable electronic device further comprises a keyboard positioned on the main body, a capacitive touch plate positioned underneath the keyboard, and a guide mark displayed on the display panel, wherein the slidable cover is capable of covering the keyboard, the guide mark moves when a finger moves along a surface of the keyboard.

* * * * *